United States Patent
Hecht

(10) Patent No.: US 10,286,623 B2
(45) Date of Patent: May 14, 2019

(54) COMPOSITE MATERIALS WITH TAPERED REINFORCEMENTS

(71) Applicant: Daniel H. Hecht, Fort Worth, TX (US)

(72) Inventor: Daniel H. Hecht, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 65 days.

(21) Appl. No.: 14/739,831

(22) Filed: Jun. 15, 2015

(65) Prior Publication Data
US 2016/0361890 A1 Dec. 15, 2016

(51) Int. Cl.
| | |
|---|---|
| B32B 3/14 | (2006.01) |
| B32B 3/18 | (2006.01) |
| B32B 7/12 | (2006.01) |
| B32B 9/00 | (2006.01) |
| B32B 9/04 | (2006.01) |
| B32B 15/04 | (2006.01) |
| B29C 70/00 | (2006.01) |

(52) U.S. Cl.
CPC ............... *B32B 3/14* (2013.01); *B29C 70/00* (2013.01); *B32B 3/18* (2013.01); *B32B 7/12* (2013.01); *B32B 9/005* (2013.01); *B32B 9/007* (2013.01); *B32B 9/041* (2013.01); *B32B 15/04* (2013.01); *B32B 2260/02* (2013.01); *B32B 2260/046* (2013.01); *B32B 2305/08* (2013.01); *B32B 2307/546* (2013.01); *B32B 2307/732* (2013.01); *B32B 2605/18* (2013.01); *Y10T 428/16* (2015.01)

(58) Field of Classification Search
None
See application file for complete search history.

(56) References Cited

U.S. PATENT DOCUMENTS

| | | | | |
|---|---|---|---|---|
| 3,563,836 A | * | 2/1971 | Dunbar | ............... F41H 5/0457 |
| | | | | 109/80 |
| 3,684,631 A | * | 8/1972 | Dunbar | ................... F41H 5/02 |
| | | | | 109/80 |
| 4,106,588 A | * | 8/1978 | Moore | .................... E04B 1/86 |
| | | | | 181/284 |
| 4,437,962 A | | 3/1984 | Banks | |
| 5,065,948 A | | 11/1991 | Bunnell, Sr. | |
| 5,100,730 A | * | 3/1992 | Lambers | ................. B32B 3/18 |
| | | | | 428/402 |

(Continued)

FOREIGN PATENT DOCUMENTS

| | | | | |
|---|---|---|---|---|
| DE | 3938741 A1 | * | 3/1991 | ......... A41D 31/0061 |
| DE | 4125918 A1 | * | 2/1992 | ............... B32B 3/28 |

(Continued)

OTHER PUBLICATIONS

Machinery's Handbook, 27th edition, Industrial Press, 2004.*
(Continued)

*Primary Examiner* — Z. Jim Yang
(74) *Attorney, Agent, or Firm* — Baker Botts L.L.P.

(57) ABSTRACT

A composite material includes a plurality of reinforcements arranged in a plurality of layers. Each reinforcement comprises a tapered shape that allows the reinforcements of a particular layer to nest with reinforcements of an adjacent layer. The composite material further includes an adhesive that is at least partially between the layers of reinforcements.

18 Claims, 6 Drawing Sheets

(56) References Cited

U.S. PATENT DOCUMENTS

| | | | |
|---|---|---|---|
| 5,134,725 A * | 8/1992 | Yeshurun | F41H 5/0435 2/102 |
| 5,192,384 A | 3/1993 | Barrier et al. | |
| 5,474,722 A | 12/1995 | Woodhams | |
| 5,601,895 A * | 2/1997 | Cunningham | A41D 31/0061 428/66.6 |
| 6,972,064 B2 | 12/2005 | Prince | |
| 7,010,897 B1 * | 3/2006 | Kuppers | E04C 2/3405 52/783.1 |
| 7,550,186 B2 | 6/2009 | Mau-Yi et al. | |
| 7,685,922 B1 * | 3/2010 | Martin | F41H 5/0414 89/36.01 |
| 8,071,171 B1 * | 12/2011 | Doty | B29C 37/0085 427/272 |
| 8,703,269 B2 | 4/2014 | Reighley et al. | |
| 8,709,321 B2 | 4/2014 | Gideon | |
| 9,366,506 B2 * | 6/2016 | Willson | F41H 5/0492 |
| 2002/0028318 A1 * | 3/2002 | Clark | B32B 3/30 428/178 |
| 2004/0121193 A1 * | 6/2004 | DeSmitt | B32B 3/20 428/323 |
| 2006/0030226 A1 * | 2/2006 | Park | F41H 5/0464 442/135 |
| 2008/0138584 A1 | 6/2008 | Grose et al. | |
| 2009/0114083 A1 * | 5/2009 | Moore, III | F41H 5/0421 89/36.02 |
| 2009/0162614 A1 * | 6/2009 | Deeley | B21D 13/04 428/167 |
| 2010/0115883 A1 * | 5/2010 | Tahric | E04C 2/326 52/793.1 |
| 2010/0181017 A1 | 7/2010 | Shinoda et al. | |
| 2011/0000001 A1 * | 1/2011 | Gur | F41H 5/0492 2/2.5 |
| 2011/0008598 A1 * | 1/2011 | Agneloni | B32B 3/16 428/213 |
| 2011/0107904 A1 * | 5/2011 | Queheillalt | F41H 5/023 89/36.02 |
| 2011/0174145 A1 * | 7/2011 | Ogrin | C04B 35/053 89/36.02 |
| 2011/0212320 A1 * | 9/2011 | Greenhill | A42B 3/12 428/313.3 |
| 2012/0132064 A1 * | 5/2012 | Hunn | F41H 5/0407 89/36.02 |
| 2012/0231214 A1 * | 9/2012 | Straza | B32B 3/28 428/131 |
| 2013/0067844 A1 * | 3/2013 | Rivers | E04B 1/02 52/424 |
| 2013/0089712 A1 | 4/2013 | Kwon et al. | |
| 2013/0189478 A1 | 7/2013 | Fischer, Jr. et al. | |
| 2014/0335300 A1 * | 11/2014 | Tsai | B32B 3/16 428/58 |
| 2015/0004371 A1 * | 1/2015 | Noble | E04C 2/3405 428/178 |
| 2015/0017383 A1 * | 1/2015 | Yang | B23P 15/00 428/116 |
| 2015/0253114 A1 * | 9/2015 | Neal | F41H 5/0421 89/36.02 |

FOREIGN PATENT DOCUMENTS

| | | | | |
|---|---|---|---|---|
| DE | 202012011496 U1 * | 3/2014 | | F41H 5/0492 |
| DE | 202012011496 U1 * | 3/2014 | | F41H 5/0492 |
| EP | 1705453 A1 * | 9/2006 | | F41H 5/023 |
| EP | 1985961 A2 * | 10/2008 | | F41H 5/0492 |
| EP | 1985961 A2 * | 10/2008 | | F41H 5/0492 |
| EP | 2233877 A1 * | 9/2010 | | F41H 5/0428 |
| EP | 2327949 A1 * | 6/2011 | | F41H 5/0428 |
| EP | 2363683 A2 * | 9/2011 | | F41H 5/0492 |

OTHER PUBLICATIONS

Manual translation of DE 3938741 A1 (Year: 2018).*

J. Tsai, et al., "Numerical simulations of fracture-toughness improvement using short shaped head ductile fibers", www.elsevier.com/locate/compositesa;www.sciencedirect.com; Composites: Part A 34 (2003) 1255-1264, Applied Science and Manufacturing 34.12; Dec 17, 2002; revised Jun. 25, 2003.

Robert M. Stack et al., "Development in Thermoforming Thermoplastic Composites", University of Massachusetts Lowell, date unknown.

* cited by examiner

COMPOSITE MATERIALS WITH TAPERED REINFORCEMENTS

TECHNICAL FIELD

This disclosure relates in general to composite materials and more particularly to composite materials with tapered reinforcements.

BACKGROUND

Composite materials are used in a variety of applications. For example, composite materials may be used to construct the airframe of an aircraft. As another example, composite materials may be used in the construction of consumer goods such as skis and bicycles. However, typical composite materials, including those that include fibers for strength, suffer from performance and durability limitations that limit their use in many applications.

SUMMARY OF THE DISCLOSURE

According to one embodiment, a composite material includes a plurality of reinforcements arranged in a plurality of layers. Each reinforcement comprises a tapered shape that allows the reinforcements of a particular layer to nest with reinforcements of an adjacent layer. The composite material further includes an adhesive that is at least partially between the layers of reinforcements.

According to another embodiment, a composite material includes a first layer of reinforcements, a second layer of reinforcements, and a third layer of reinforcements located between the first layer of reinforcements and the second layer of reinforcements. The reinforcements of the third layer at least partially overlap gaps between the reinforcements of the first and second layers. The composite material further includes an adhesive that is at least partially between the layers of reinforcements. Each reinforcement comprises a tapered shape that allows the layers of reinforcements to nest together but remain flexible.

According to another embodiment, a composite material includes a plurality of flakes arranged in a plurality of layers. Each flake includes a tapered shape wherein an outer edge of the flake is thinner than a center area of the flake. The tapered shape allows the flakes of a particular layer to nest with flakes of an adjacent layer by overlapping gaps between flakes of the adjacent layer. The composite material further includes an epoxy at least partially between the layers of flakes.

Technical advantages of certain embodiments may include providing a composite material that has a high volume fraction with isotropic load capability that results in uniform load paths and minimum interface stresses. The disclosed composite material with tapered reinforcements provides stiffness in all directions and out performs fiber-reinforced composite materials but remain flexible enough to conform locally to achieve high volume fractions. The over-lapping flakes with laminar morphology of some disclosed embodiments will process robustly as sheet molding compound (SMC) which reacts to normal processing forces by compacting and further nesting the tapered shapes. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Composite materials are used in a variety of applications. For example, composite materials may be used to construct vehicles including aircraft, automobiles, spacecraft, and watercraft. As another example, composite materials may be used in the construction of consumer goods including sporting goods such as skis and bicycles. However, typical composite materials, including those that include fibers for strength, suffer from performance and durability limitations that limit their use in many applications. For example, many aircraft applications have high performance requirements that exclude many typical composite materials.

The teachings of the disclosure recognize that reinforcing composite materials with tapered reinforcements can increase the performance of the composite material. The tapered shape of the reinforcements, which may include flakes, ribbons or other shapes, enable the reinforcements to nest together to form a high volume fraction, nested micro structure with isotropic load capability. This nested micro structure of tapered reinforcements provides improved strength and performance of the composite material. The following describes composite materials with tapered reinforcements for providing these and other desired features.

Figure 1:
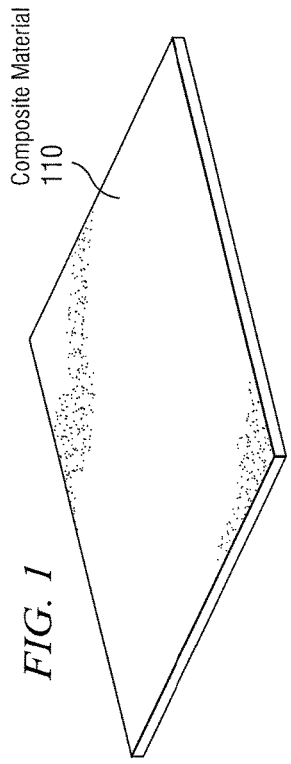
FIG. 1 illustrates a composite material, according to certain embodiments.

FIG. 1 illustrates a composite material 110, according to certain embodiments. Composite material 110 may be any composite material that is used for any appropriate vehicle or product, as described above. For example, composite material 110 may be a pre-ceramic, hypersonic composite. As other examples, composite material 110 represents all stages of the composite and may be a malleable, curable sheet molding compound (SMC), a carbon epoxy composite, and the like.

The performance of typical composite materials is limited by many factors. For example, any fibers or other structures added to increase the strength of the composite material typically have random shapes, have squared-off profiles, and are randomly distributed. These and other factors may cause weak spots in the composite material and may cause high loads to be distributed to the edges of the reinforcing structure. Composite material 110, however, includes tapered reinforcements 210, which reduce or eliminate these and other problems associated with typical composite materials. As described in more detail below, some embodiments of reinforcements 210 have regular two dimensional (2D) shapes (e.g., circular, square, hexagonal, and the like) that are tapered to the edge of reinforcement 210. This enables layers of reinforcements 210 to nest together, thereby allowing controlled packing of reinforcements 210 and uniform load paths through composite material 110. Tapering the 2D shape to the edge of reinforcement 210 also promotes the nesting of reinforcements 210 with center-to-edge alignment, which maximizes the ability of composite material 110 to transfer loads at minimum interface stresses. Tapering the 2D shape to the edge of reinforcement 210 also changes its property response: as the thickness of reinforcement 210 decreases towards its edge, any applied loads are transferred into the matrix before the edge of the reinforcement. This minimizes stress concentration at the edges of reinforcements 210.

Figure 2:
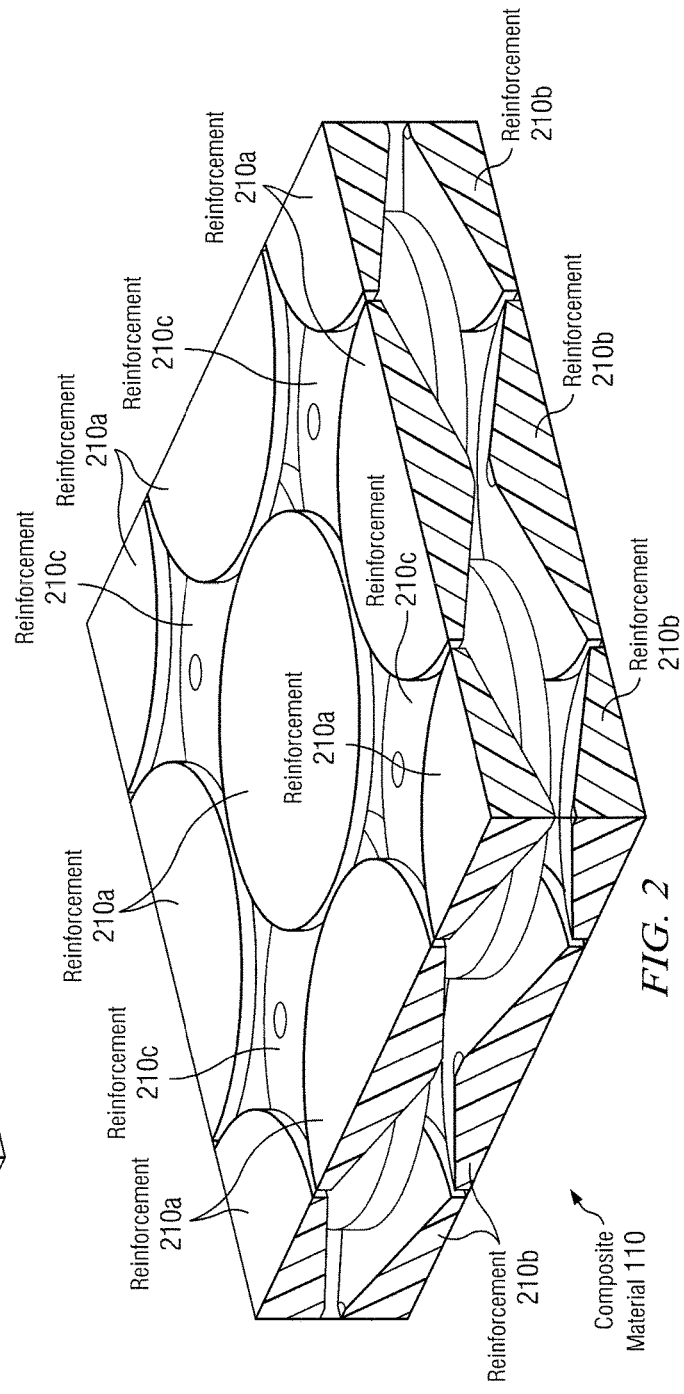
FIG. 2 illustrates example tapered flake reinforcements of the composite material of FIG. 1, according to certain embodiments.

FIG. 2 illustrates example tapered flake reinforcements 210 of composite material 110 of FIG. 1, according to certain embodiments. In general, reinforcements 210 have a tapered shape that allows layers of reinforcements 210 to nest together but remain flexible. An adhesive such as an epoxy or resin (e.g., adhesive 310 described below in reference to FIG. 3) may be applied in some embodiments between reinforcements 210. While reinforcements 210 are illustrated as flakes in FIG. 2, reinforcements 210 may be any other appropriate structure such as ribbons.

The 2D isotropic nature (i.e., uniform in-plane properties) of reinforcements 210 does not require the higher strength of fiber composites to carry most of the load in the appropriately aligned plies of a quasi-isotropic composite. Thus, a 0.5% strain-to-failure reinforcement 210 can handle as much or more load than a 1.8% strain-to-failure fiber of the same material.

Reinforcements 210 may be formed using any appropriate material such as carbon, ceramic, glass, graphite, metal or metal alloys (e.g., titanium), metallic glass alloys (e.g., Metglas), and the like. In some embodiments, reinforcements 210 have an elastic modulus of at least 6 million pounds per square inch (MSI). In a particular embodiment, reinforcements 210 have an elastic modulus of between 20 and 40 MSI (e.g., approximately 30 MSI). In some embodiments, reinforcements 210 may be formed using casting of thermosetting polymer or embossing films of pre-ceramic materials (both inorganic and organic). In some embodiments, a method utilizing membrane deflections may be used to produce the desired geometry of reinforcements 210. For example, precision contours of reinforcements 210 may be produced using membrane deformation over perforated backing plates. In some embodiments, reinforcements 210 are directly fabricated using chemical vapor deposition (CVD).

Figure 3:
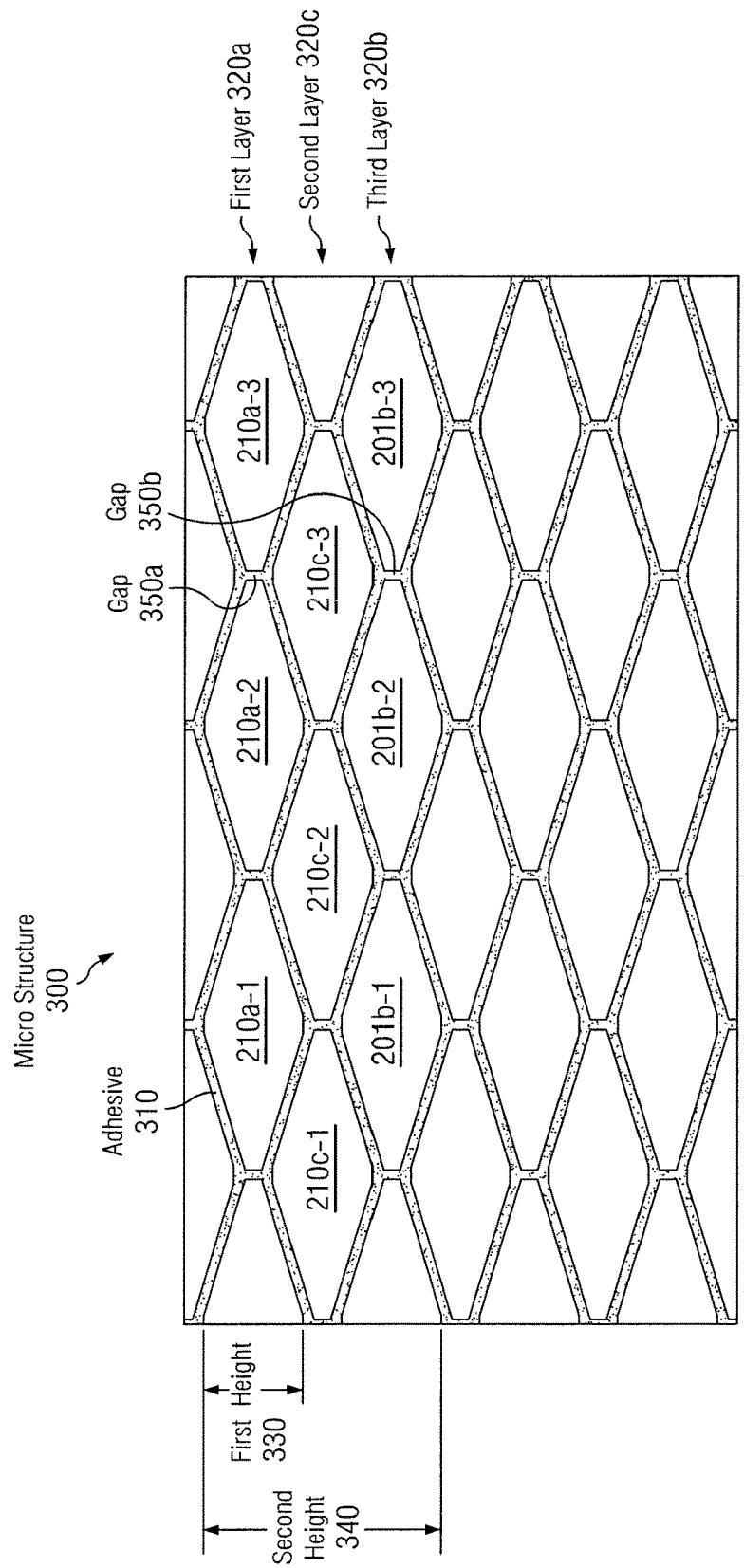
FIG. 3 illustrates an example micro structure that includes layers of reinforcements that may be used in the composite material of FIG. 1, according to certain embodiments.

As illustrated in FIGS. 2 and 3, reinforcements 210 may be nested together in layers. For example, composite material 110 may include a first layer of reinforcements 210a, a second layer of reinforcements 210b, and a third layer of reinforcements 210c that is between reinforcements 210a and reinforcements 210b. In other embodiments, composite material 110 may have any number of layers of reinforcements 210. A particular embodiment of layers of reinforcements 210 is discussed in more detail below in reference to FIG. 3.

Reinforcements 210 may be nested together using any appropriate technique. For example, sonic nesting, ultrasonic enhanced compaction, or any other vibration technique may be used. In some embodiments, small normal forces (e.g., less than 10 psi) may be used deform and to fully nest reinforcements 210, thereby filling in any low volume fraction areas and reducing stress concentrations normally associated with un-nested, discontinuous reinforcements. Nested reinforcements 210 at high volume fraction have a natural tendency to self-arrange via interference. Any processing forces that are normal to the surface reinforce this tendency.

FIG. 3 illustrates a cross-sectional view (i.e., a side view) of a micro structure 300 that includes layers 320 (e.g., layers 320a-320c) of reinforcements 210 that may be used in composite material 110 of FIG. 1, according to certain embodiments. In some embodiments, micro structure 300 includes a first layer 320a, a second layer 320b, and a third layer 320c that is located between first layer 320a and second layer 320b, as illustrated. Layers 320 may include any number of reinforcements 210. For example, first layer 320a may include at least reinforcements 210a-1 through 210a-3, second layer 320b may include at least reinforcements 210b-1 through 210b-3, and third layer 320c may include at least reinforcements 210c-1 through 210c-3, as illustrated. In some embodiments, micro structure 300 may have a volume fraction of approximately 80%. Micro structure 300 may include any number of layers 320 and each layer 320 may include any number of reinforcements 210.

In some embodiments, micro structure 300 includes an adhesive 310 that is located at least partially between layers 320. Adhesive 310 may be any appropriate adhesive for bonding reinforcements 210 of layers 320 together. In some embodiments, adhesive 310 is any appropriate epoxy or resin. In some embodiments, composite material is fully impregnated with adhesive 310.

In some embodiments, micro structure 300 includes gaps 350 (e.g., gaps 350a and 350b) between reinforcements 210 of layers 320. For example, gap 350a may separate reinforcement 210a-2 and 210a-3 of first layer 320a. As another example, gap 350b may separate reinforcement 210b-2 and 210b-3 of second layer 320b. Gaps 350 are shown in more detail in the top-down views of reinforcements 210 of FIGS. 6a and 6b.

Figure 6A:
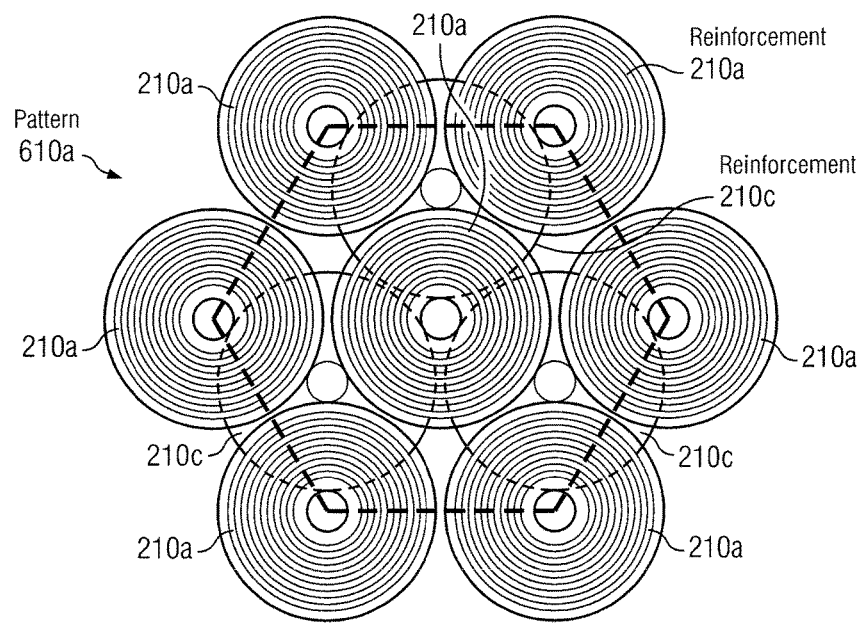
FIGS. 6a and 6B illustrate example patterns of reinforcements, according to certain embodiments.
Figure 6B:
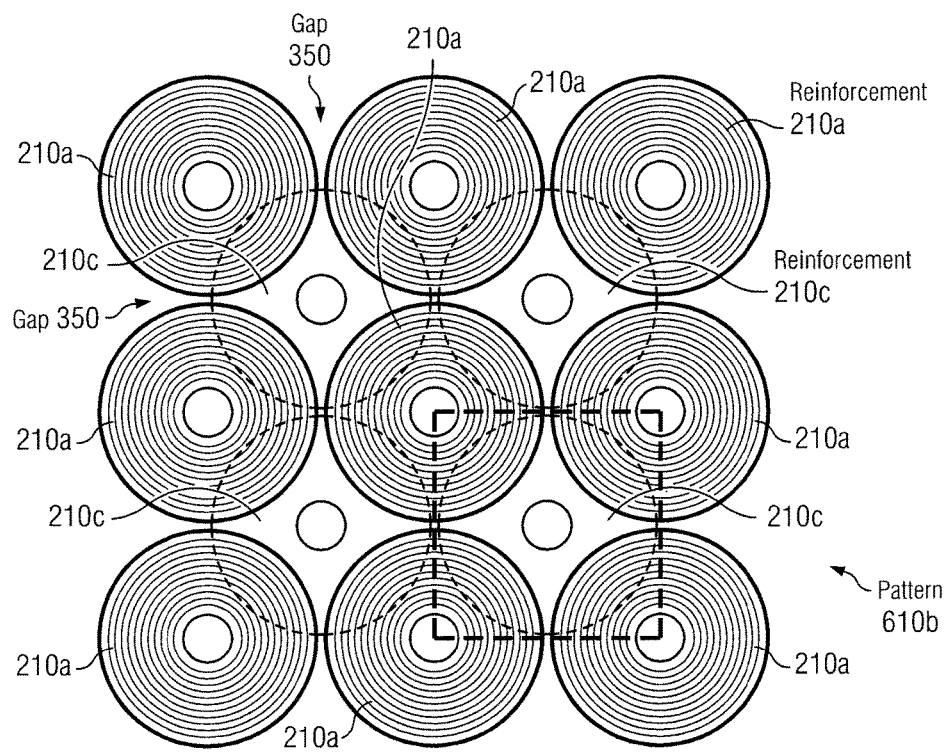

In some embodiments, reinforcements 210 at least partially overlap one or more gaps 350. For example, reinforcement 210c-3 of third layer 320c at least partially overlaps gap 350a between reinforcement 210a-2 and reinforcement 210a-3 and gap 350b between reinforcement 210b-2 and reinforcement 210b-3. FIGS. 6a and 6b illustrate how reinforcements 210 at least partially overlap gaps 350 in some embodiments.

As illustrated in FIG. 3 and in more detail below with respect to FIG. 4, each reinforcement 210 has a first height 330. First height 330 may also be considered the height of each layer 320 in embodiments where all reinforcements 210 have substantially the same height. Within micro structure 300, layers 320a-320c may form a sub structure having a second height 340. Because reinforcements 210 of third layer 320c nest within reinforcements 210 of first layer 320a and second layer 320b as illustrated, second height 340 is less than three times first height 330. As explained in more detail below in reference to FIG. 4, reinforcements 210 are able to nest with other reinforcements 210 because they have a tapered cross-sectional shape in which an outer edge of reinforcement 210 is thinner than a center area of reinforcement 210. While reinforcements 210 in FIGURE have a conical cross-sectional shape, other reinforcements 210 may have any other tapered cross-sectional shape such as an ellipsoidal or a paraboloidal cross-sectional shape.

Figure 4:
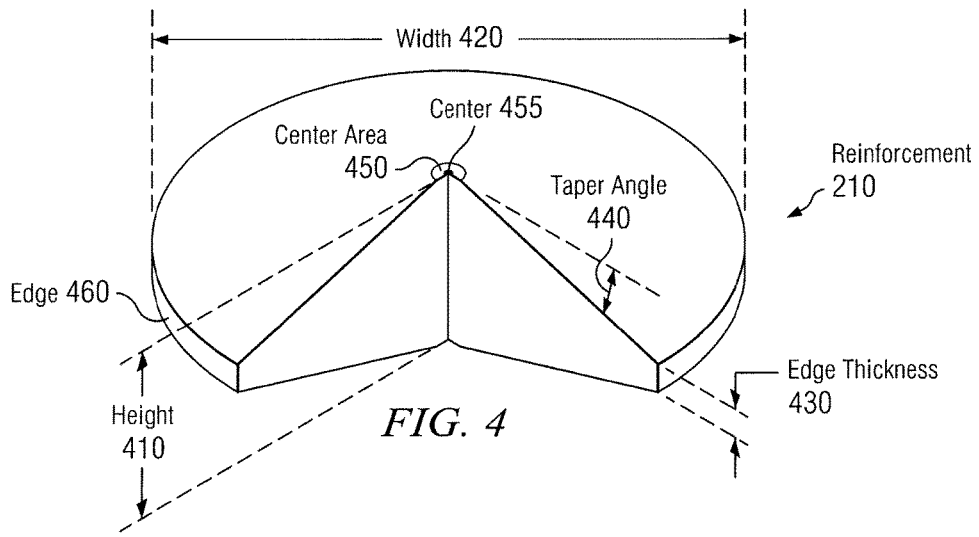
FIG. 4 illustrates an example flake reinforcement of FIGS. 2-3, according to certain embodiments.

FIG. 4 illustrates an example flake reinforcement 210 of FIGS. 2-3, according to certain embodiments. While reinforcement 210 of FIG. 4 has a circular top-down shape, other reinforcements 210 may have any other top-down shape such as a square or a hexagon, as illustrated in FIGS. 8a-8f.

The example reinforcement 210 of FIG. 4 has a height 410, a width 420, an edge thickness 430, a taper angle 440, a center area 450, and an edge 460. Height 410 is generally the overall thickness of reinforcement 210 and is measured at center 455. Because reinforcement 210 has a tapered cross-sectional shape, height 410 is greater than edge thickness 430. In some embodiments, edge thickness 430 is zero or near-zero (i.e., reinforcement 210 is tapered to a sharp point). In other embodiments, edge thickness 430 is non-zero.

In some embodiments, width 420 is greater than or equal to 500 microns and less than or equal to 5,000 microns. In some embodiments, height 410 is greater than or equal to 5 microns and less than or equal to 25 microns. In some embodiments, reinforcements 210 have a modulus ratio (i.e., a reinforcement to matrix ratio) of approximately 60. In some embodiments, reinforcements 210 have a width-to-thickness ratio of approximately 300. For example, width 420 is approximately 1800 microns and height 410 is approximately 6 microns in one embodiment. Given the example dimensions of 1800 micros wide by 6 micros thick, the image in FIG. 4 should be stretched around 100× in both the x and y directions for proper scaling. While particular embodiments having micron dimensions have been described, other embodiments may have nano dimensions.

Taper angle 440 is any appropriate angle and may or may not be constant between center area 450 and edge 460. In some embodiments, taper angle 440 may be between approximately ten and thirty degrees, inclusive. For example, taper angle 440 may be approximately twenty degrees. In some embodiments, taper angle 440 may be between approximately one and ten degrees, inclusive. For example, taper angle 440 may be approximately one degrees or two degrees. In some embodiments, taper angle 440 may be less than one degree.

In some embodiments, taper angle 440 may be determined from a ratio of properties of reinforcement 210 and matrix materials. In general, the matrix properties of interest are lower than the reinforcement; the arcsin of the appropriate matrix property divided by the reinforcement property will provide an estimate of the taper angle. Multiple property ratios may need to be determined with the smallest angle likely to be required as it represents the weakest link of composite material 110. Typical property ratios may include: matrix (shear or bulk) modulus/reinforcement modulus; matrix interface strength/reinforcement strength; and matrix strength/reinforcement strength. Thus, low stiffness reinforcements in stiff matrices may allow a large taper angle (>10 degrees) while very stiff and strong reinforcements may require the smallest taper angles to efficiently transfer the load from reinforcement-to-reinforcement.

Center area 450 may be any appropriate shape or size. In some embodiments, center area 450 may generally be the same overall shape as reinforcement 210. For example, if reinforcement 210 has a circular top-down shape as illustrated in FIG. 4, center area 450 may also be circular as illustrated. In some embodiments, the width of circular shape may be zero (i.e., a point at center 455) or it may be any non-zero width as illustrated in FIG. 4.

Figure 5A:
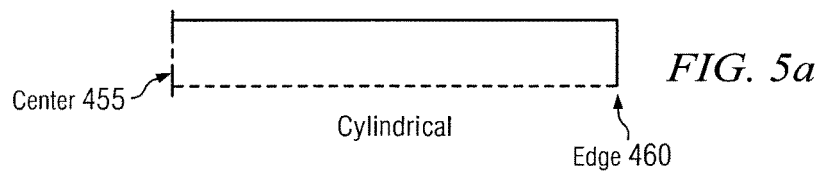
FIGS. 5a-5d illustrate various cross-sectional shapes of the flake reinforcements of FIGS. 2-4, according to certain embodiments.
Figure 5B:
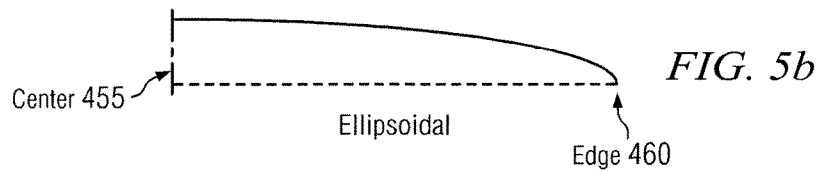
Figure 5C:
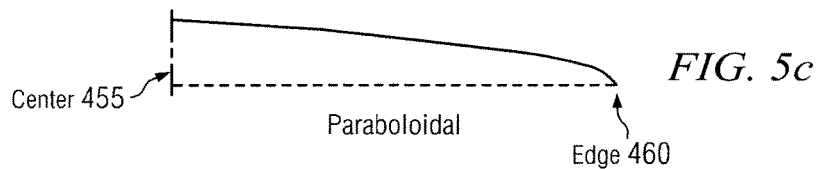
Figure 5D:
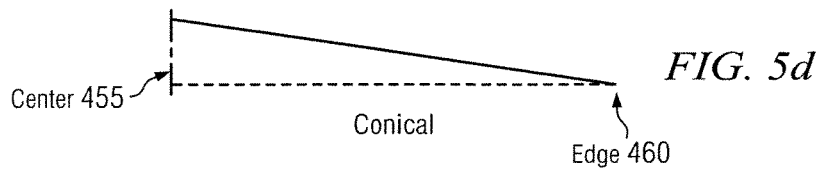

FIGS. 5a-5d illustrate various cross-sectional shapes of flake reinforcements 210 of FIGS. 2-4, according to certain embodiments. As mentioned above, reinforcements 210 may have any appropriate cross-sectional shape. For example, FIG. 5a illustrates a cylindrical shape of reinforcement 210 between center 455 and edge 460, FIG. 5b illustrates an ellipsoidal shape of reinforcement 210 between center 455 and edge 460, FIG. 5c illustrates a paraboloidal shape of reinforcement 210 between center 455 and edge 460, and FIG. 5d illustrates a conical shape of reinforcement 210 between center 455 and edge 460. While certain embodiments of reinforcements 210 are illustrated in FIGS. 5a-5d, reinforcements 210 may have any appropriate tapered shape that allows nesting of reinforcements 210.

FIGS. 6a and 6B illustrate example patterns 610a and 610b of reinforcements 210, respectively, according to certain embodiments. Patterns 610a and 610b include at least two layers of reinforcements 210. For example, reinforcements 210a of FIGS. 6a-6b may correspond to a first layer such as first layer 320a, and reinforcements 210c of FIGS. 6a-6b may correspond to another layer such as third layer 320c. The reinforcements 210 of each layer may be arranged in any appropriate pattern. For example, pattern 610a illustrates an embodiment in which reinforcements 210 are arranged in a hexagonal pattern. That is, reinforcements 210 of pattern 610a are arranged such that the centers of reinforcements 210 (e.g., centers 455) form a hexagon as illustrated. As another example, pattern 610b illustrates an embodiment in which reinforcements 210 are arranged in a square pattern. That is, reinforcements 210 of pattern 610b are arranged such that the centers of reinforcements 210 (e.g., centers 455) form squares as illustrated. In addition, FIGS. 6a-6b illustrate, as discussed above, how certain reinforcements 210 may overlap gaps 350 in other reinforcements 210. For example, the reinforcements 210 of one layer (e.g., reinforcements 210c) may overlap gaps 350 between reinforcements 210a. While hexagon and square patterns 610a-610b are illustrated in FIGS. 6a and 6b, reinforcements 210 may be arranged in any appropriate pattern or configuration.

Figure 7:
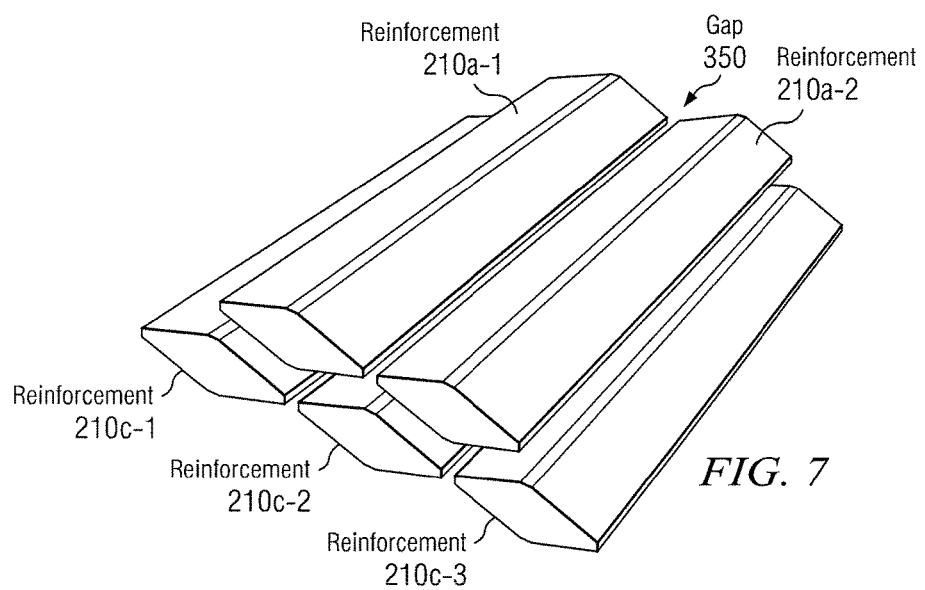
FIG. 7 illustrates example tapered ribbon reinforcements of the composite material of FIG. 1, according to certain embodiments.

FIG. 7 illustrates example tapered ribbon reinforcements 210 of composite material 110 of FIG. 1, according to certain embodiments. Tapered ribbon reinforcements 210 may be considered as stretched flakes and may have any tapered cross-sectional shape and dimensions, as described above. In addition, tapered ribbon reinforcements 210 may also be arranged in two or more layers, as illustrated. For example, tapered ribbon reinforcements 210a-1 and 210a-2 may correspond to a first layer such as first layer 320a described above, and tapered ribbon reinforcements 210c-1 through 210c-3 may correspond to a third layer such as third layer 320b above. In some embodiments, tapered ribbon reinforcements 210 may be formed using auto tape layup.

Figure 8A:
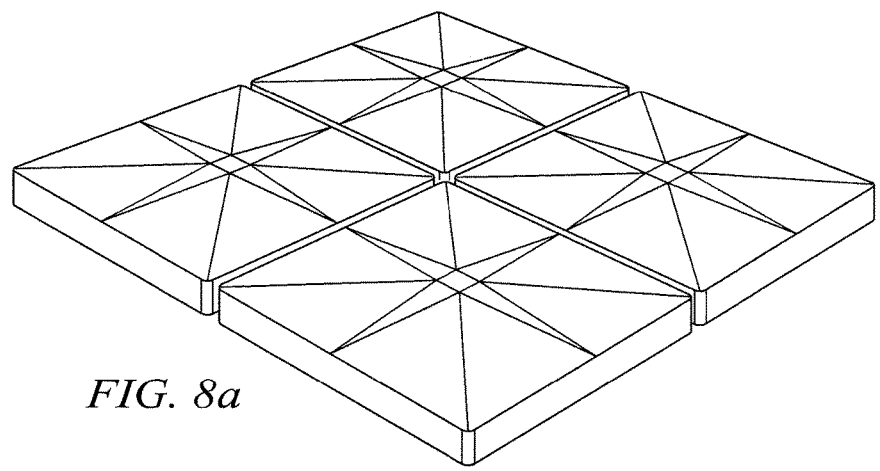
FIGS. 8a-8f illustrate example flake reinforcements of the composite material of FIG. 1, according to certain embodiments.
Figure 8B:
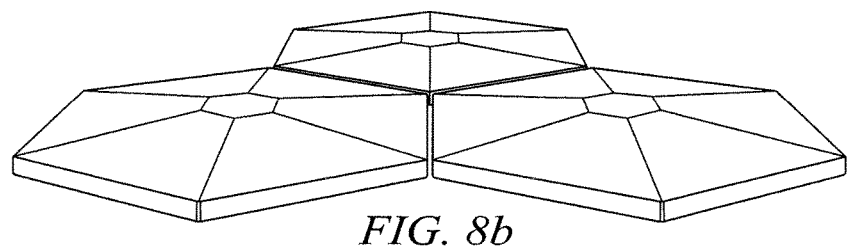
Figure 8C:
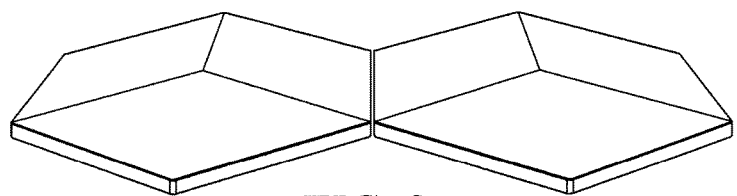
Figure 8D:
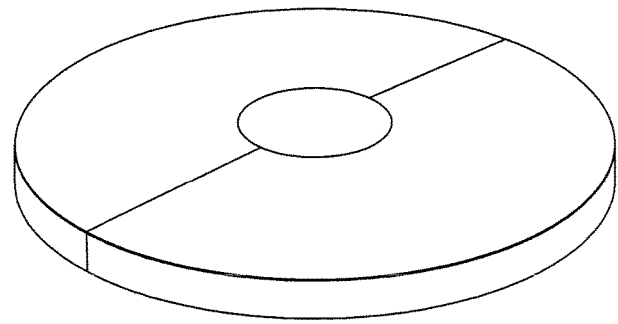
Figure 8E:
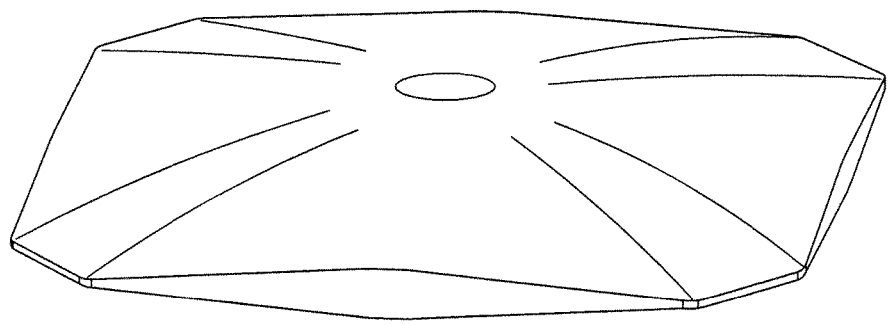
Figure 8F:
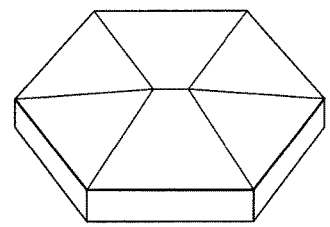

FIGS. 8a-8f illustrate example tapered flake reinforcements 210 of composite material 110 of FIG. 1, according to certain embodiments. FIG. 8a illustrates an example square reinforcement 210. FIGS. 8b and 8f illustrate example hexagonal reinforcements 210. FIGS. 8c and 8e illustrate example hexagonal (prismatic) reinforcements 210. FIG. 8d illustrates a circular (e.g., a disc) reinforcement 210. While embodiments illustrated in FIGS. 8a-8f have certain edge thicknesses (i.e., edge thickness 430 described above), other embodiments may have sharp edges (i.e., edge thickness 430 may be zero or near-zero).

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A composite material, comprising:
   a first layer of reinforcements;
   a second layer of reinforcements;
   a third layer of reinforcements located between the first layer of reinforcements and the second layer of reinforcements; and
   adhesive at least partially between the layers of reinforcements;
   wherein:
      each particular reinforcement comprises a tapered shape that allows the layers of reinforcements to nest together but remain flexible, the tapered shape comprising a paraboloidal cross-sectional shape;
      each particular reinforcement comprises a first maximum height and a maximum width, the first maximum height and the maximum width respectively measured along a first direction and a second direction of the composite material, wherein the first maximum height of each particular reinforcement is less than the maximum width of said each particular reinforcement;
      the paraboloidal cross-sectional shape of each particular reinforcement comprises a vertex and a focus that are both collinear with the maximum width of said each particular reinforcement;
      the first, second, and third layers of reinforcements form a structure comprising a second maximum height, the second maximum height measured along the first direction of the composite material; and
      the second maximum height is less than three times the first maximum height.

2. The composite material of claim 1, wherein the reinforcements comprise flakes or ribbons.

3. The composite material of claim 1, wherein an outer edge of each reinforcement is thinner than a center area of the reinforcement.

4. The composite material of claim 1, wherein each reinforcement comprises a shape of a circle.

5. The composite material of claim 1, wherein the reinforcements of each layer are arranged in a square or a hexagon pattern.

6. The composite material of claim 1, wherein:
   the maximum width of said each particular reinforcement is greater than or equal to 500 microns and less than or equal to 5,000 microns; and
   the first maximum height of said each particular reinforcement is greater than or equal to 5 microns and less than or equal to 25 microns.

7. The composite material of claim 1, wherein the reinforcements are formed of carbon, ceramic, glass, graphite, or metal.

8. The composite material of claim 1, wherein the reinforcements comprise an elastic modulus of at least 6 million pounds per square inch (psi).

9. The composite material of claim 1, wherein each reinforcement comprises:
   a plurality of apices comprising a top apex and a bottom apex; and
   a flat and circular edge between the top apex and the bottom apex, the flat and circular edge comprising a thickness that is greater than zero.

10. The composite material of claim 1, wherein each reinforcement comprises a shape of a square, a hexagon, or an octagon.

11. The composite material of claim 1, wherein each reinforcement comprises a width-to-thickness ratio of approximately 300.

12. A material, comprising:
   a plurality of reinforcements arranged in a plurality of layers, each reinforcement formed from graphite and comprising a tapered shape, the tapered shape comprising a paraboloidal cross-sectional shape, each reinforcement having a maximum height and a maximum width, the maximum height and the maximum width respectively measured along a first direction and a second direction of the material, wherein the maximum height of each particular reinforcement is less than the maximum width of said each particular reinforcement, the plurality of layers comprising:
      a first layer of reinforcements; and
      a second layer of reinforcements, wherein reinforcements of the second layer overlap reinforcements of the first layer in the first direction; and
   adhesive at least partially between the layers of reinforcements;
   wherein the paraboloidal cross-sectional shape of each particular reinforcement comprises a vertex and a focus that are both collinear with the maximum width of said each particular reinforcement.

13. The material of claim 12, wherein the reinforcements comprise flakes or ribbons.

14. The material of claim 12, wherein:
   an outer edge of each reinforcement is thinner than a center area of the reinforcement; and
   each reinforcement comprises a shape of a circle, a square, or a hexagon.

15. The material of claim 12, wherein:
   the maximum width of said each particular reinforcement is greater than or equal to 500 microns and less than or equal to 5,000 microns; and
   the maximum height of said each particular reinforcement is greater than or equal to 5 microns and less than or equal to 25 microns.

16. A material, comprising:
a plurality of flakes arranged in a plurality of layers, each flake formed from graphite and comprising a tapered shape wherein an outer edge of the flake is thinner than a center area of the flake, the tapered shape comprising a paraboloidal cross-sectional shape, each flake having a maximum height and a maximum width, the maximum height and the maximum width respectively measured along a first direction and a second direction of the material, wherein the maximum height of each particular flake is less than the maximum width of said each particular flake, the plurality of layers comprising:
a first layer of flakes; and
a second layer of flakes, wherein flakes of the second layer overlap flakes of the first layer in the first direction; and
epoxy at least partially between the layers of flakes;
wherein the paraboloidal cross-sectional shape of each particular flake comprises a vertex and a focus that are both collinear with the maximum width of said each particular flake.

17. The material of claim 16, wherein each flake comprises a shape of a circle, a square, or a hexagon.

18. The material of claim 16, wherein:
the maximum width of said each particular reinforcement is greater than or equal to 500 microns and less than or equal to 5,000 microns; and
the maximum height of said each particular reinforcement is greater than or equal to 5 microns and less than or equal to 25 microns.

* * * * *